(12) United States Patent
Fujimoto (10) Patent No.: US 7,444,026 B2
(45) Date of Patent: Oct. 28, 2008

(54) IMAGE PROCESSING APPARATUS AND METHOD OF MOTION VECTOR DETECTION IN A MOVING PICTURE, AND RECORDING MEDIUM USED THEREWITH

(75) Inventor: Yuji Fujimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 10/770,034

(22) Filed: Feb. 2, 2004

(65) Prior Publication Data

US 2004/0184542 A1 Sep. 23, 2004

(30) Foreign Application Priority Data

Feb. 4, 2003 (JP) .............................. 2003-026702

(51) Int. Cl.
*G06K 9/46* (2006.01)
(52) U.S. Cl. ....................... 382/236; 348/699; 382/299; 382/236
(58) Field of Classification Search ................. 382/236, 382/240, 107, 298; 348/699
See application file for complete search history.

(56) References Cited

U.S. PATENT DOCUMENTS

| | | | | |
|---|---|---|---|---|
| 5,542,003 A | * | 7/1996 | Wofford | 382/132 |
| 5,838,827 A | * | 11/1998 | Kobayashi et al. | 382/236 |
| 5,873,824 A | * | 2/1999 | Doi et al. | 600/408 |
| 5,878,746 A | * | 3/1999 | Lemelson et al. | 600/407 |
| 6,380,986 B1 | * | 4/2002 | Minami et al. | 348/699 |
| 6,795,578 B1 | * | 9/2004 | Kotani et al. | 382/180 |
| 2003/0156747 A1 | * | 8/2003 | Faber | 382/128 |
| 2005/0276330 A1 | * | 12/2005 | Park et al. | 375/240.17 |

FOREIGN PATENT DOCUMENTS

JP 8 265771 10/1996

OTHER PUBLICATIONS

Schultz et al. Title "Subpixel Motion Estimation for Super-Resolution Image Sequence Enhancement", Journal of Visual communication and image representation. vol. 9, No. 1, Mar., pp. 38-50, 1998.*

* cited by examiner

*Primary Examiner*—Jingge Wu
*Assistant Examiner*—Tsung-Yin Tsai
(74) *Attorney, Agent, or Firm*—Frommer Lawrence & Haug LLP; William S. Frommer; Paul A. Levy (57) ABSTRACT

An image processing apparatus and method comprising a reduced image generating unit, a superblock matching unit, a motion vector converting unit, a possible vector selecting unit, a base vector selecting unit, and a macroblock matching unit. The reduced image generating unit generates a reduced image by reducing the size of an image composed of moving picture data. The superblock matching unit calculates a motion vector of each superblock constituting the reduced image. The motion vector converting unit converts the motion vector of each superblock into a possible motion vector common to four macroblocks. For a macroblock of interest, a possible vector selecting unit extracts a motion vector in an adjacent macroblock and possible motion vectors. A base vector determining unit selectively determines a base vector from among the extracted possible vectors. A macroblock matching unit executes block matching in a predetermined search range around the base vector.

7 Claims, 8 Drawing Sheets

CURRENT FRAME

FIG. 6B

BEFORE 1 FRAME

IMAGE PROCESSING APPARATUS AND METHOD OF MOTION VECTOR DETECTION IN A MOVING PICTURE, AND RECORDING MEDIUM USED THEREWITH

BACKGROUND OF THE INVENTION

1. Field of the Invention

The present invention relates to image processing apparatuses and methods, recording media and programs used therewith, and in particular, to an image processing apparatus and method suitable for use in the case of performing compression coding on moving picture data in accordance with the MPEG-4 (Moving Picture Experts Group-4) standard, and a recording medium and a program which are used therewith.

2. Description of the Related Art

The MPEG standards are widely used as methods for performing compression coding on digital moving picture data. In particular, the MPEG-4 standard that can perform coding at a compression ratio (e.g., 10 kbps to 2 Mbps) higher than conventional has attracted attention as a method for obtaining moving picture data in order to be supplied to so-called "mobile devices" such as cellular phones.

Similarly to the MPEG-2 standard, in the MPEG-4 standard, in the process of compression coding, an image is divided into macroblocks of a predetermined size, and motion vectors of the macroblocks are detected.

Figure 1:
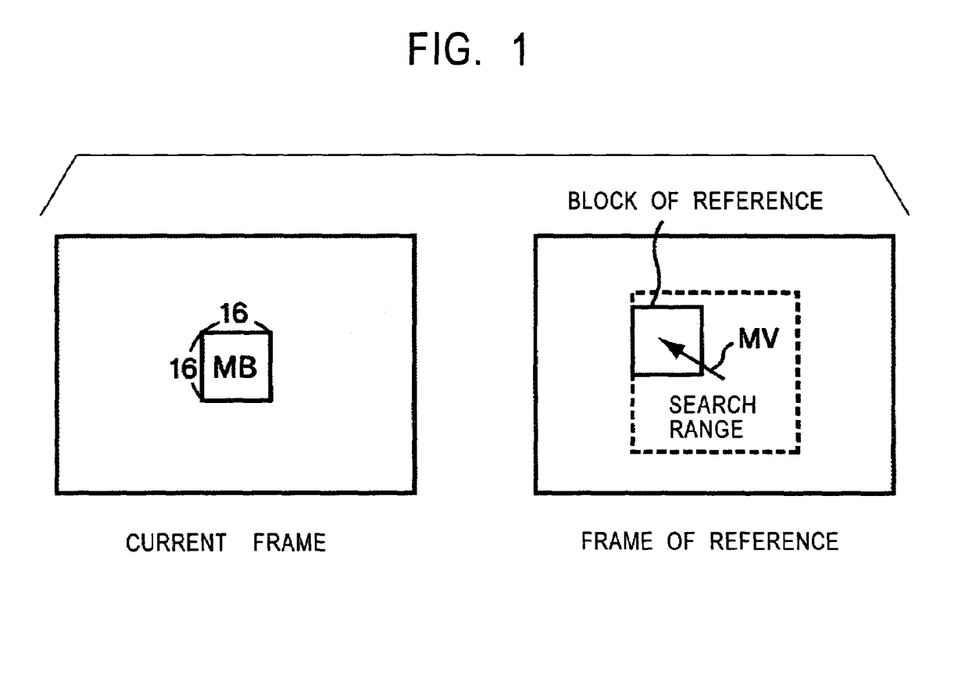
FIG. 1 is an illustration of block matching.

In all-motion search for detecting motion vectors of macroblocks, as shown in FIG. 1, for a frame image (hereinafter referred to as a "current frame") to be compression-coded, a macroblock (MB) having a predetermined size (e.g., 16 by 16 pixels) is set, and block matching is performed between the macroblock and a search range set in a frame of reference. Specifically, in the search range, the block of reference, which is similar in size to the macroblock, is moved, and as is represented by the following expression:

$$AD = \Sigma |c(i,j) - r(i,j)|$$

where the sum AD (hereinafter referred to simply as the "AD") of the absolute values of differences between pixel $c(i, j)$ of the macroblock and each corresponding pixel $r(i, j)$ in blocks of reference in the search range is calculated. The AD is detected as a motion vector (MV) in accordance with the position of the block of reference in a case in which the AD is the minimum.

There is a possibility that detection of a motion vector for each macroblock by using the above all-motion search cannot be applied to real-time coding because the number of calculations of ADs is extremely large.

Figure 2:
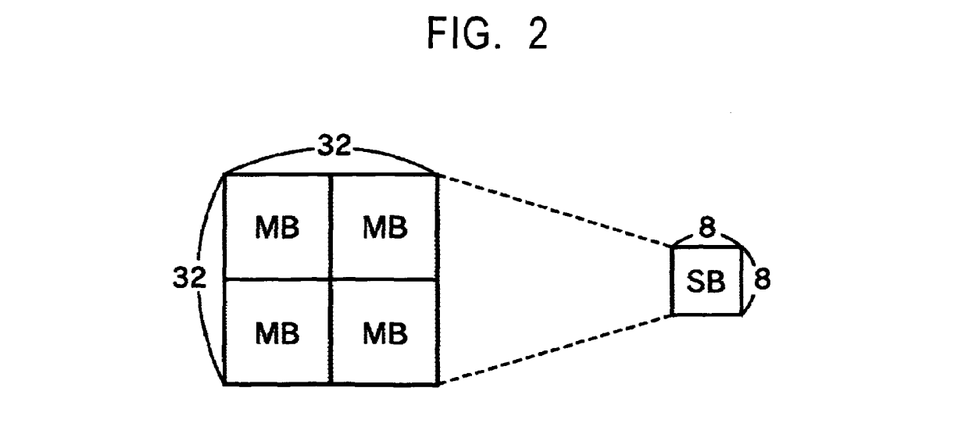
FIG. 2 is an illustration of a relationship between macroblocks and a superblock.

Accordingly, the following hierarchical search for motion has been proposed as a method for detecting a motion vector of each macroblock. In the hierarchical search for motion, in first hierarchical processing, as FIG. 2 shows, a plurality of (e.g., four) macroblocks in a current frame are reduced in size at a predetermined magnification (¼) to generate a superblock (SB). By executing block matching for the superblock, a motion vector for the superblock is detected.

In second hierarchical processing, a motion vector for the superblock is extended at the predetermined magnification, and in a relatively narrow search range having the extended motion vector as a reference, motion vectors of the original macroblocks for the superblock are detected by the all-motion search or the like (see, for example, Published Japanese Translation No. 2002-518897 of PCT International Publication for Patent Application). In the hierarchical search for motion, the number of calculations of ADs can be reduced because, in the second hierarchical processing, a relatively narrow search range of the all-motion search can be set.

The second hierarchical processing in the hierarchical search for motion searches only a relatively narrow range based on vectors obtained by extending the superblock motion vector calculated in the first hierarchical processing.

Thus, the second hierarchical processing has a problem in that, depending on circumstances, a true motion vector for each macroblock may not be detected.

Figure 3A:
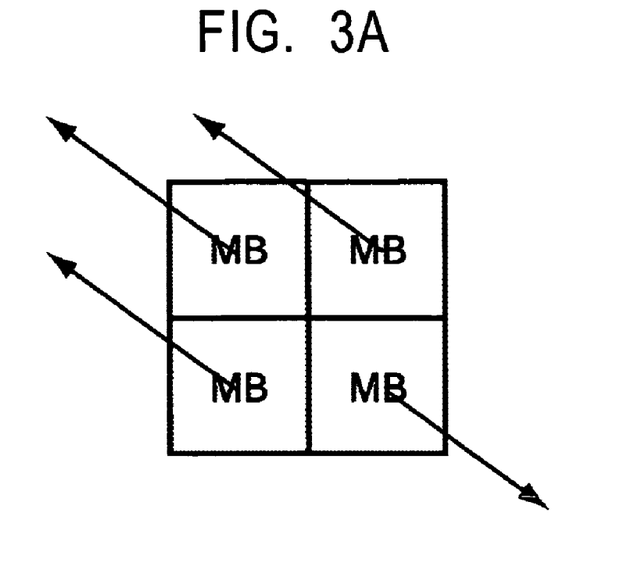
FIGS. 3A, 3B, 3C are illustrations of a problem in the case of searching, based on a motion vector for a superblock, for motion vectors for macroblocks.
Figure 3B:
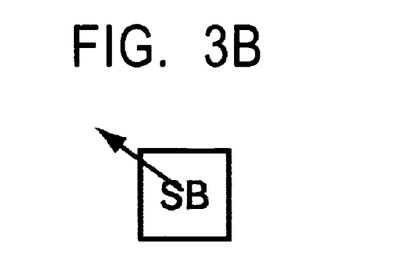
Figure 3C:
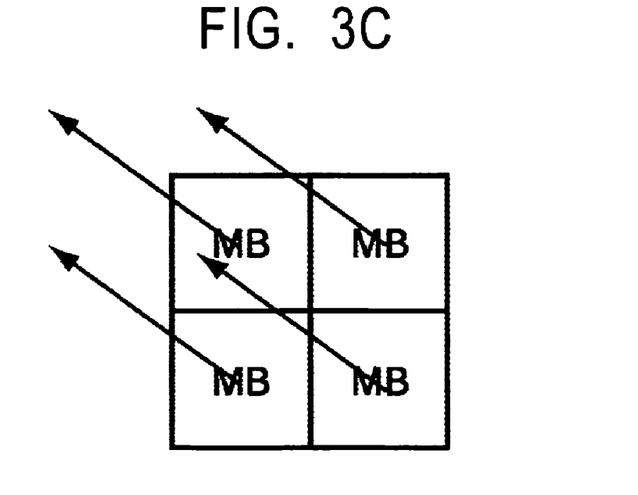

By way of example, it is assumed that true motion vectors for a plurality of (in this case, four) macroblocks constituting a superblock are as shown in FIG. 3A. In the first hierarchical processing, a motion vector for a superblock is detected as shown in FIG. 3B. The second hierarchical processing searches a relatively narrow range based on vectors as shown in FIG. 3C, obtained by extending the motion vector of the superblock. In this case, although it is considered that true motion vectors of macroblocks other than the bottom right macroblock in FIG. 3A are detected, an accurate true motion vector of the bottom right macroblock is not detected.

By expanding the search range in the second hierarchical processing, also for the bottom right macroblock in FIG. 3C, an accurate true macroblock can be detected. Nevertheless, the above manner increases the number of calculations of ADs. Thus, this is against the original purpose (decrease in the number of calculations of ADs) of the hierarchical search for motion.

SUMMARY OF THE INVENTION

The present invention is made in view of the above circumstances, and it is an object of the present invention to provide an image processing apparatus and method in which a reduced number of calculations accurately performs a motion vector detecting process in the process of performing compression coding on moving picture data in accordance with the MPEG-4 standard or the like, and a recording medium used therewith.

According to an aspect of the present invention, an image processing apparatus for detecting motion vectors in an image composed of moving picture data is provided. The image processing apparatus includes a reduced-image generating unit for generating, by reducing the size of the image composed of the moving picture data as first pixel blocks, a reduced image constituted by second pixel blocks smaller than the first pixel blocks, a first detecting unit for detecting motion vectors in the reduced image in units of the second pixel blocks, a setting unit for setting, by extending the motion vectors which are detected for the second pixel blocks by the first detecting unit, a plurality of possible motion vectors of the first pixel blocks causing the second pixel blocks, an extracting unit for extracting, for a first pixel blocks of interest in the image whose motion vector is to be detected among the first pixel blocks, motion vectors already detected for adjacent first pixel blocks among the first pixel blocks or the possible motion vectors, a selecting unit for selecting a base vector from the motion vectors or possible motion vectors extracted by the extracting unit, and a second detecting unit for detecting, in a predetermined search range around the base vector selected by the selecting unit, the motion vectors for the first pixel block of interest in the image.

Preferably, the image processing apparatus further includes a coding unit for performing, by using motion vectors for the first block of interest which are adjacent to the first block of interest, variable length coding on the motion vectors which are detected for the first pixel block of interest by the second detecting unit.

For each of the first pixel block of interest in the image whose motion vector is to be detected, the extracting unit may extract motion vectors used in the variable length coding by the coding unit among the motion vectors already detected for the adjacent first pixel blocks, or possible motion vectors used in the variable length coding by the coding unit among the possible motion vectors already detected for the adjacent first pixel blocks.

When one of the motion vectors already detected for the adjacent first pixel blocks is selected as the base vector by the selecting unit, the second detecting unit may detect the motion vectors for the first pixel block of interest in the image in a search range narrower than a search range used when one of the possible motion vectors already detected for the adjacent first pixel blocks is selected as the base vector by the selecting unit.

At least one of the first detecting unit, the selecting unit, and the second detecting unit may use block matching.

According to another aspect of the present invention, an image processing method for detecting motion vectors in an image composed of moving picture data is provided. The image processing method includes a reduced-image generating step for generating, by reducing the size of the image composed of the moving picture data as first pixel blocks, a reduced image constituted by second pixel blocks smaller than the first pixel blocks, a first detecting step for detecting motion vectors in the reduced image in units of the second pixel blocks, a setting step for setting, by extending the motion vectors which are detected for the second pixel blocks in the first detecting step, a plurality of possible motion vectors of the first pixel blocks causing the second pixel blocks, an extracting step for extracting, for a first pixel block of interest in the image whose motion vector is to be detected among the first pixel blocks, motion vectors already detected for adjacent first pixel blocks among the first pixel blocks or the possible motion vectors, a selecting step for selecting a base vector from the motion vectors or possible motion vectors extracted in the extracting step, and a second detecting step for detecting, in a predetermined search range around the base vector selected in the selecting step, motion vectors for the first pixel block of interest in the image.

According to another aspect of the present invention, a recording medium having a computer-readable program recorded thereon is provided. The program includes a reduced-image generating step for generating, by reducing the size of the image composed of the moving picture data as first pixel blocks, a reduced image constituted by second pixel blocks smaller than the first pixel blocks, a first detecting step for detecting motion vectors in the reduced image in units of the second pixel blocks, a setting step for setting, by extending the motion vectors which are detected for the second pixel blocks in the first detecting step, a plurality of possible motion vectors of the first pixel blocks causing the second pixel blocks, an extracting step for extracting, for a first pixel block of interest in the image whose motion vector is to be detected among the first pixel blocks, motion vectors already detected for adjacent first pixel blocks among the first pixel blocks or the possible motion vectors, a selecting step for selecting a base vector from the motion vectors or possible motion vectors extracted in the extracting step, and a second detecting step for detecting, in a predetermined search range around the base vector selected in the selecting step, motion vectors for the first pixel block of interest in the image.

According to another aspect of the present invention, a program for detecting motion vectors in an image composed of moving picture data is provided. The program allows a computer to execute a process including a reduced-image generating step for generating, by reducing the size of the image composed of the moving picture data as first pixel blocks, a reduced image constituted by second pixel blocks smaller than the first pixel blocks, a first detecting step for detecting motion vectors in the reduced image in units of the second pixel blocks, a setting step for setting, by extending the motion vectors which are detected for the second pixel blocks in the first detecting step, a plurality of possible motion vectors of the first pixel blocks causing the second pixel blocks, an extracting step for extracting, for a first pixel block of interest in the image whose motion vector is to be detected among the first pixel blocks, motion vectors already detected for adjacent first pixel blocks among the first pixel blocks or the possible motion vectors, a selecting step for selecting a base vector from the motion vectors or possible motion vectors extracted in the extracting step, and a second detecting step for detecting, in a predetermined search range around the base vector selected in the selecting step, motion vectors for the first pixel block of interest in the image.

According to an image processing apparatus and method, and recording medium and program of the present invention, an image constituted by first pixel blocks are reduced in size to generate a reduced image constituted by second pixel blocks smaller than the first pixel blocks. Motion vectors in the reduced image are detected in units of the second pixel blocks, and motion vectors detected for the second pixel blocks are extended, whereby possible motion vectors of the first pixel blocks causing the second pixel blocks are set. For one first pixel block of interest in the image which whose motion vector is to be detected, motion vectors already detected motion vectors for adjacent first pixel blocks or the possible motion vectors are extracted. From the extracted motion vectors or possible motion vectors, a base vector is selected, and in a search range around the selected base vector, the motion vectors for the first pixel block of interest are detected.

According to the present invention, a reduced number of calculations enables accurate detection of motion vectors in an image.

DESCRIPTION OF THE PREFERRED EMBODIMENTS

Figure 4:
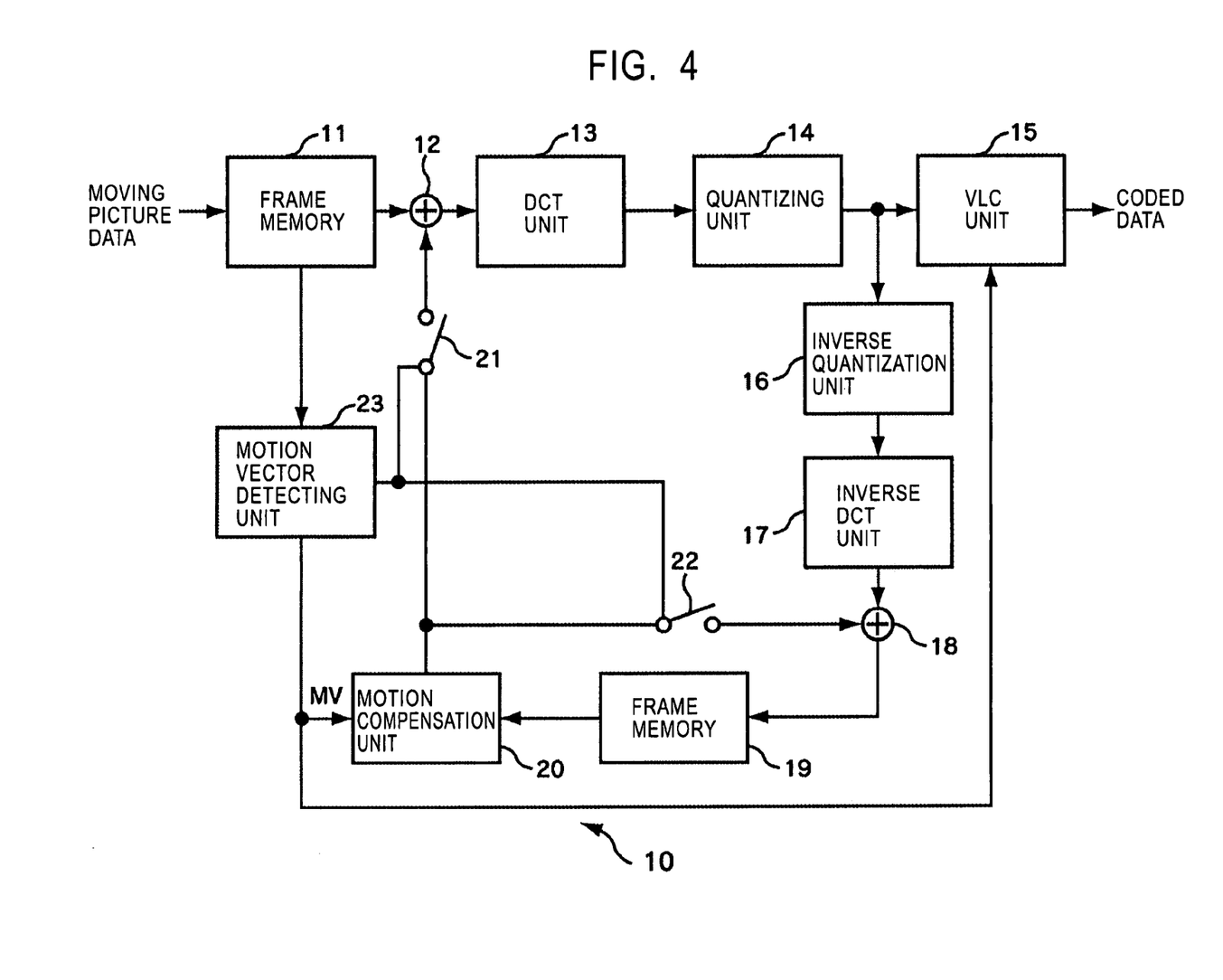
FIG. 4 is a block diagram showing an example of an encoder according to an embodiment of the present invention.

FIG. 4 shows an example of an encoder 10 to which the present invention is applied. The encoder 10 generates coded data by performing compression coding on input moving picture data in accordance with the MPEG-4 standard.

A frame memory 11 temporarily stores the input moving pictured data to be compression-coded. A difference calculating unit 12 reads a current frame stored in the frame memory 11, calculates a difference from a predictive frame supplied from a motion compensation unit 20 through a switch 21, and outputs the difference to a discrete cosine transform (DCT) unit 13. The DCT unit 13 performs DCT processing on the output of the difference calculating unit 12, and outputs the resultant DCT coefficients to a quantizing unit 14.

The quantizing unit 14 quantizes the DCT coefficients input from the DCT unit 13, and outputs the quantized DCT coefficients to a variable length code (VLC) unit 15 and an inverse quantization unit 16. By using differences from predictive vectors obtained by averaging top center, top right and side left macroblocks among macroblocks of interest, the VLC unit 15 converts the quantized DCT coefficients (hereinafter referred to also as the "quantized coefficients") input from the quantizing unit 14 and motion vectors MV input from a motion vector detecting unit 23 into coded data as a variable length code such as a Huffman code, and outputs the coded data to a post-stage.

The inverse quantization unit 16 restores the DCT coefficients by performing inverse quantization on the quantized coefficients input from the quantizing unit 14, and outputs the DCT coefficients to an inverse DCT unit 17. The inverse DCT unit 17 obtains difference data by performing inverse DCT processing on the DCT coefficients input from the inverse quantization unit 16, and outputs the difference data to an adder unit 18. The adder unit 18 generates a restored frame by adding the difference data input from the inverse DCT unit 17 and a predictive frame supplied from a motion compensation unit 20 through a switch 22, and outputs the frame to a frame memory 19.

The frame memory 19 temporarily stores the restored frame from the adder unit 18. Based on the motion vectors MV for the macroblocks in the current frame input from the motion vector detecting unit 23 and on a prediction mode, the motion compensation unit 20 reads the restored frame stored in the frame memory 19. The motion compensation unit 20 outputs the restored frame as a prediction frame to the difference calculating unit 12 through the switch 21, and outputs the restored frame to the adder unit 18 through the switch 22. Each of the switches 21 and 22 is turned on and off in accordance with the prediction mode input from the motion vector detecting unit 23.

The motion vector detecting unit 23 reads the moving picture data stored in the frame memory 11 in units of frames, sets a predetermined sized macroblock in each frame, and sequentially detects motion vectors MV from the top left macroblock to bottom right macroblock in the frame. Also, based on the motion vectors detected for the macroblocks, the motion vector detecting unit 23 selects, as the prediction mode, one of an intra-prediction mode and an inter-prediction mode. The motion vector detecting unit 23 also supplies the motion compensation unit 20 and the VLC unit 15 with the detected motion vectors MV for the macroblocks and the selected prediction mode. The motion vector detecting unit 23 supplies the selected prediction mode to the switches 21 and 22.

Figure 5:
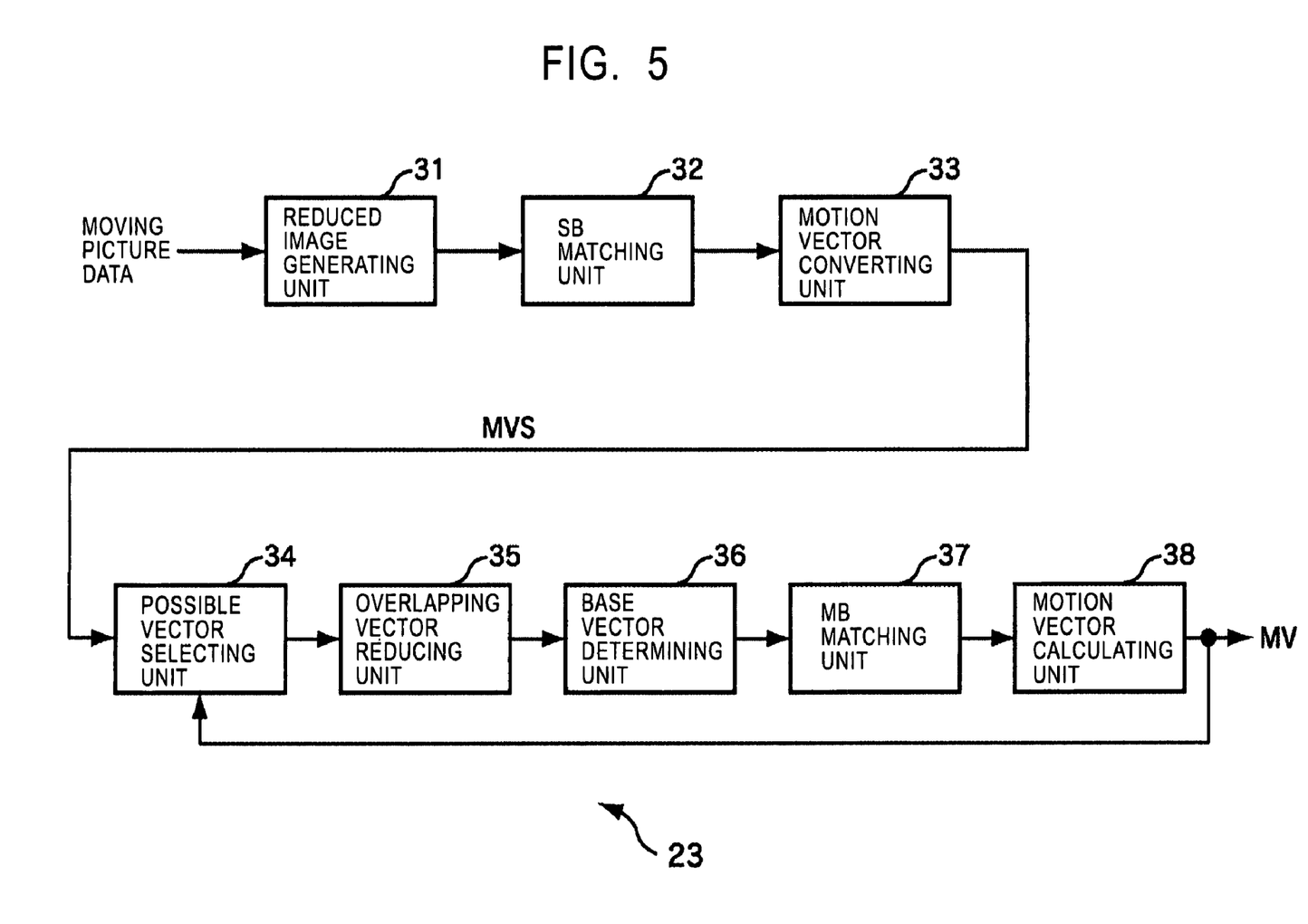
FIG. 5 is a block diagram showing an example of the motion vector detecting unit shown in FIG. 4.

FIG. 5 shows an example of a part of the motion vector detecting unit 23 which detects the motion vectors MV.

A reduced image generating unit 31 generates a reduced image by reducing the size of an image composed of the moving picture data read in units of frames from the frame memory 11. Specifically, for example, each of the vertical and horizontal sizes of the image is reduced to ¼ in such a manner that, as shown in FIG. 2, 8 by 8 pixels (one superblock) constituting the reduced image are generated from 32 by 32 pixels (four macroblocks) in one frame of moving picture data.

By executing block matching in units of superblocks between the reduced image for the current frame which is generated by the reduced image generating unit 31 and a reduced image for a frame of reference, the superblock matching unit 32 calculates motion vectors of superblocks constituting the reduced image for the current frame. By extending the motion vectors of the superblocks at a predetermined magnification (4 times in the case shown in FIG. 2), a motion vector converting unit 33 generates a possible motion vector (MVS) which is common to four macroblocks, which cause the superblocks.

Figure 6A:
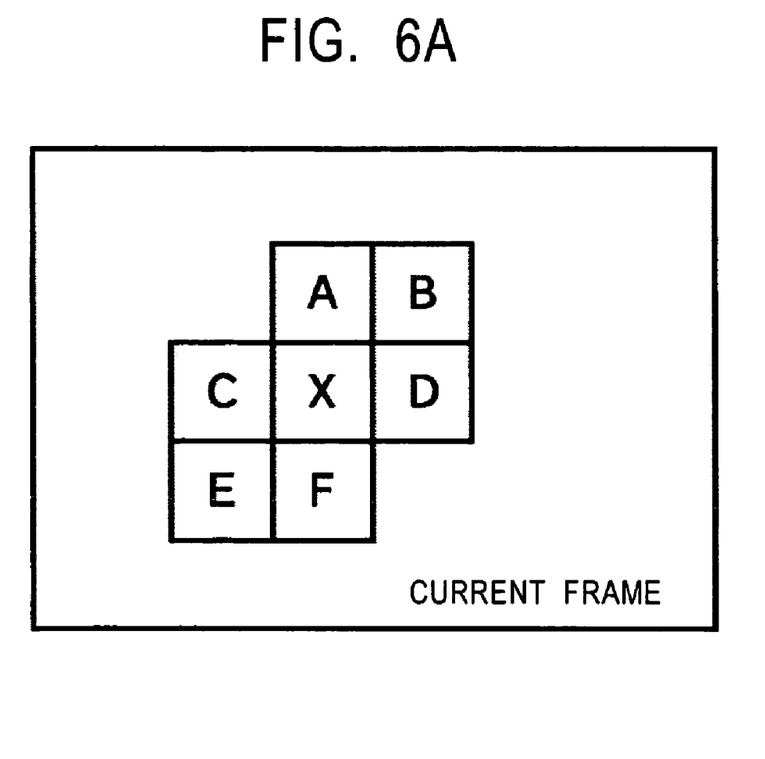
FIGS. 6A and 6B are illustrations of the positions of macroblocks for a possible vector.

A possible vector selecting unit 34 selects possible base motion vectors (hereinafter referred to as "possible motion vectors" or MVB) each of which is a base for each range for searching a motion vector $MV_X$ of macroblock X of interest in the current frame. Specifically, as FIG. 6A shows, for macroblock X, the possible vector selecting unit 34 selects, as possible vectors, an already detected motion vector $MV_A$ of top center macroblock A, a motion vector $MV_B$ of top right macroblock B, a motion vector $MV_C$ of side left macroblock C, a possible motion vector $MVS_X$ of macroblock X of interest, a possible vector $MVS_D$ of side right macroblock D, a possible motion vector $MVS_E$ of bottom left macroblock E, and a possible motion vector $MVS_F$ of bottom center macroblock F.

The reason that macroblocks A, B, C, D, E, and F are of interest is that a reduction in the number of codes generated by the VLC unit 15 can be expected because the motion vectors $MV_A$, $MV_B$, and $MV_C$ are used when the motion vector $MV_X$ of macroblock X of interest is variable-length-coded by the VLC unit 15, and the motion vector $MV_X$ of macroblock X of interest is used when the motion vectors $MV_D$, $MV_E$, and $MV_F$ are variable-length-coded by the VLC unit 15.

Figure 6B:
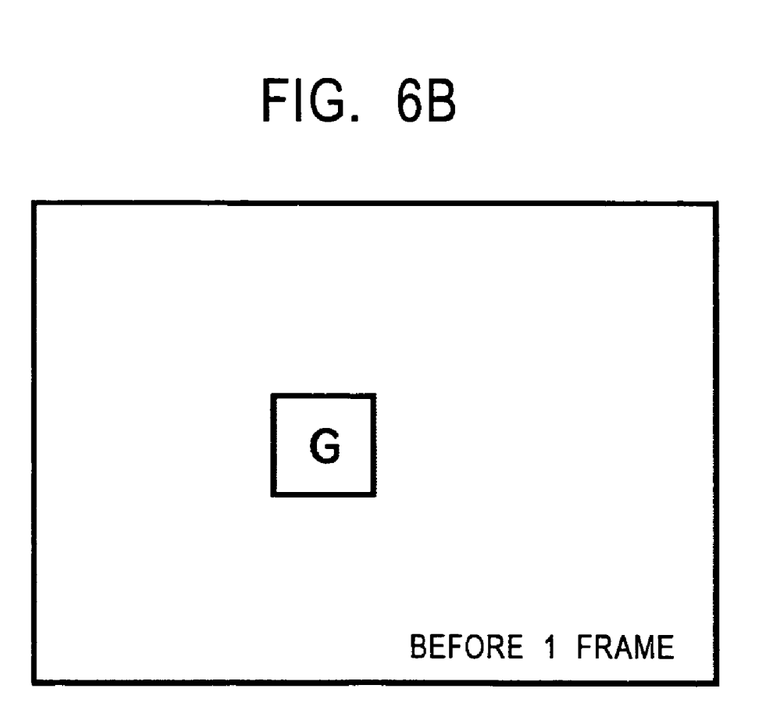

The possible vector selecting unit 34 may additionally select, as a possible vector, motion vector $MV_G$ of macroblock G at the same position in a state of one frame before the current frame, as shown in FIG. 6B.

An overlapping vector reducing unit 35 deletes overlapping vectors among the vectors selected by the possible vector selecting unit 34. This can reduce the number of calculations in stages after the overlapping vector reducing unit 35.

A base vector determining unit 36 calculates the sum AD of the absolute values of differences from pixels corresponding to blocks of reference at positions obtained by shifting macroblock X of interest in the current frame from each corresponding position in the frame of reference by each possible vector, and determines that a possible vector in which the sum AD is the minimum is a base vector MVB.

A macroblock matching unit 37 executes, for macroblock X of interest in the current frame, block matching in a predetermined search range around the base vector MVB. A motion vector calculating unit 38 calculates the motion vector $MV_X$ of macroblock X of interest in the current frame in response to the result of processing by the macroblock matching unit 37. The determined motion vector $MV_X$ of interest of macroblock X is output to the motion compensation unit 20, etc., and are supplied as possible motion vectors $MV_D$, $MV_E$, and $MV_F$ to the possible vector selecting unit 34.

When the base vector is one of the motion vectors $MV_A$, $MV_B$, and $MV_C$, the motion vectors are already established values and are highly reliable. Thus, a search range in the case of executing block matching by the macroblock matching unit 37 can be set to, for example, approximately ±2 pixels around the base vector. In addition, when the base vector is one of possible motion vectors $MVS_X$, $MVS_D$, $MVS_E$, and $MVS_F$, the search range is set broader compared with the above case, for example, approximately ±4 pixels around the base vector.

In either case, the search range in the case of executing block matching can be set to be relatively narrower than that as in the related art. Therefore, the number of calculations required for block matching can be reduced.

Figure 7:
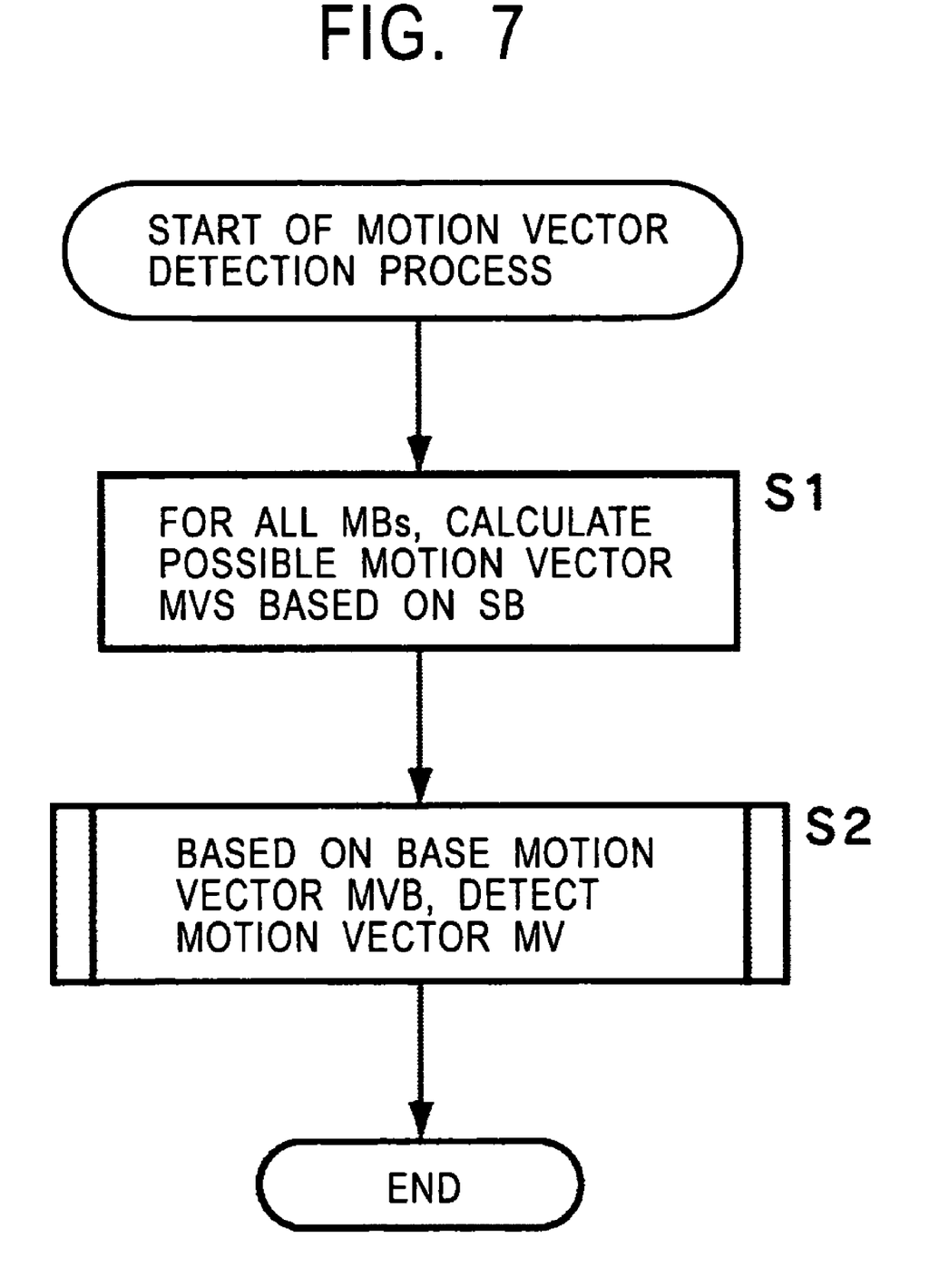
FIG. 7 is a flowchart illustrating a motion vector detecting process performed by the motion vector detecting unit.

Next, a motion vector detecting process of the motion vector detecting unit 23 is described below with reference to the flowchart shown in FIG. 7.

In step S1, by executing block matching in units of superblocks between a reduced image which corresponds to the current frame and which is generated by the power-level-forming converting unit 31, and a reduced image corresponding to a frame of reference, the superblock matching unit 32 in the motion vector detecting unit 23 calculates a motion vector of each superblock constituting the reduced image corresponding to the current frame. The motion vector converting unit 33 generates a possible motion vector MVS common to four macroblocks causing each superblock by extending the motion vector of each superblock at a predetermined magnification.

In this stage, the possible motion vectors MVS are generated for all the macroblocks constituting the current frame.

In step S2, for each macroblock constituting the current frame, the motion vector detecting unit 23 determines a base vector based on each possible motion vector MVS generated in step S1, or the like, and detects a motion vector MV based on the base vector.

Figure 8:
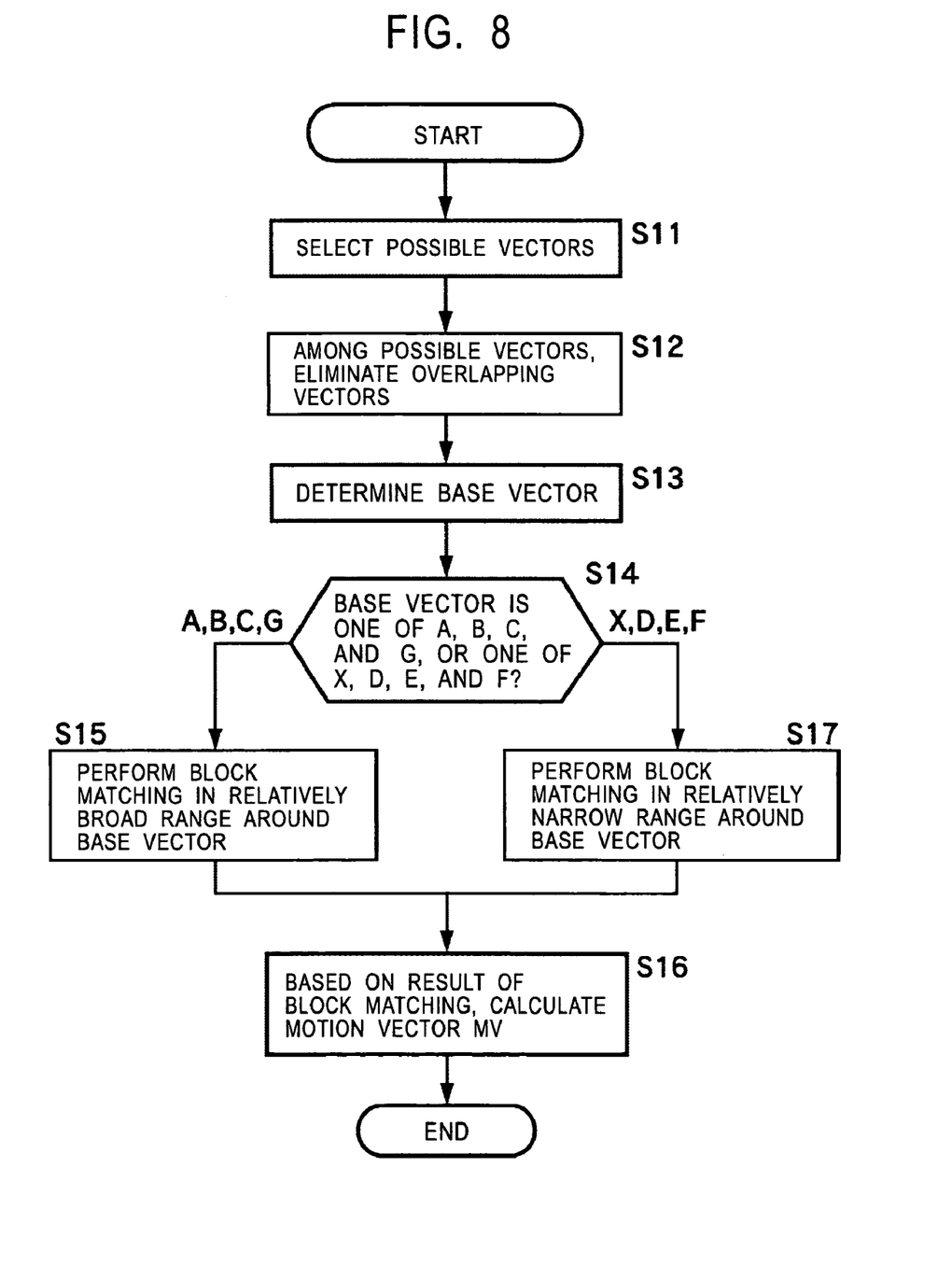
FIG. 8 is a flowchart illustrating the step S2 shown in FIG. 7.

Regarding details of step S2, the case of detecting a motion vector $MV_X$ of macroblock X of interest in the current frame is described below with reference to the flowchart shown in FIG. 8.

In step S11, the possible vector selecting unit 34 selects possible vectors for a base vector MVB which is a base for a range for searching for the motion vector $MV_X$ of macroblock X of interest. Specifically, as shown in FIG. 6A, for macroblock X of interest, the motion vector $MV_A$ of top center macroblock A, the motion vector $MV_B$ of top right macroblock B, the motion vector $MV_C$ of side left macroblock C, the motion vector $MV_G$ of macroblock G at the same position in a state of one frame before the current frame, the possible motion vector $MVS_X$ of macroblock X of interest, the possible motion vector $MVS_D$ of side right macroblock D, the possible motion vector $MVS_E$ of bottom left macroblock E, and the possible motion vector $MVS_F$ of bottom center macroblock F are selected as possible vectors.

In step S12, the overlapping vector reducing unit 35 eliminates overlapping vectors among the possible vectors selected by the possible vector selecting unit 34. In step S13, the base vector determining unit 36 calculates the sum AD of the absolute values of differences from pixels corresponding to blocks of reference at positions obtained by shifting macroblock X of interest in the current frame from each corresponding position in the frame of reference by each possible vector, and determines that a possible vector in which the sum AD is the minimum is the base vector MVB.

In step S14, the macroblock matching unit 37 determines which of the motion vectors $MV_A$, $MV_B$, $MV_C$, and $MV_G$, the possible vector determined to be the base vector $MV_B$ is. When it is determined that the possible vector determined to be the base vector $MV_B$ is one of the motion vectors $MV_A$, $MV_B$, $MV_C$, and $MV_G$, the process proceeds to step S15.

In step S15, for macroblock X of interest in the current frame, the macroblock matching unit 37 executes block matching in a relatively narrow search range of ±2 pixels around the base vector MVB. In step S16, motion vector calculating unit 38 calculates the motion vector $MV_X$ of macroblock X of interest in the current frame in accordance with the result of block matching by the macroblock matching unit 37.

When it is determined in step S14 that the possible vector determined to be the base vector MVB is not one of the motion vectors $MV_A$, $MV_B$, and $MV_G$, that is, the possible vector determined to be the base vector MVB is one of the motion vectors $MVS_X$, $MVS_D$, $MVS_E$, and $MVS_F$, the process proceeds to step S17.

In addition, in step S17, for macroblock X of interest in the current frame, the macroblock matching unit 37 executes block matching in a relatively broad search range of approximately ±4 pixels around the base vector MVB.

The description of the motion vector detecting process of the motion vector detecting unit 23 ends.

According to the motion vector detecting process of the motion vector detecting unit 23, the motion vector detection described with reference to FIG. 3 can be prevented from failing. Also, since possible vectors are selected so that the codes required to perform variable length coding on motion vectors, so-called "vector irregularity" can be prevented from occurring, compared with the case of searching motion vectors by only using block matching as in the related art. Moreover, a narrowed search range for motion vectors reduces the number of calculations. Thus, for example, in a Common Intermediate Format (CIF) sequence, the processing time can be reduced approximately 15% to 20%, depending on image content.

In the above-described motion vector detecting process, from among possible vectors, only one base vector MVB is determined by the coding circuit 26. However, by determining a plurality of base vectors MVB1, ..., in ascending order of the ADs calculated in step S13, and searching for the motion vector $MV_X$ of each macroblock of interest in which each of the base vectors MVB1, ..., is used as a base, a false motion vector $MV_X$ for the minimum AD can be prevented from being detected.

In addition, the present invention can be applied not only to MPEG-4 encoders, but also to encoders using methods such as MPEG-1, MPEG-2, and the Joint Video Team (JVT) standard. Also, the present invention can be applied to an image processing apparatus that executes in-image motion detecting processing.

The above-described motion vector detecting unit 23 can be realized by hardware having a configuration as shown in FIG. 5, and can be executed by software. In other words, when software is used to execute the motion vector detecting process of the motion vector detecting unit 23, programs constituting the software are installed from a recording medium into a computer built into dedicated hardware, or one such as a multipurpose personal computer in which, by installing various programs, various functions can be executed.

Figure 9:
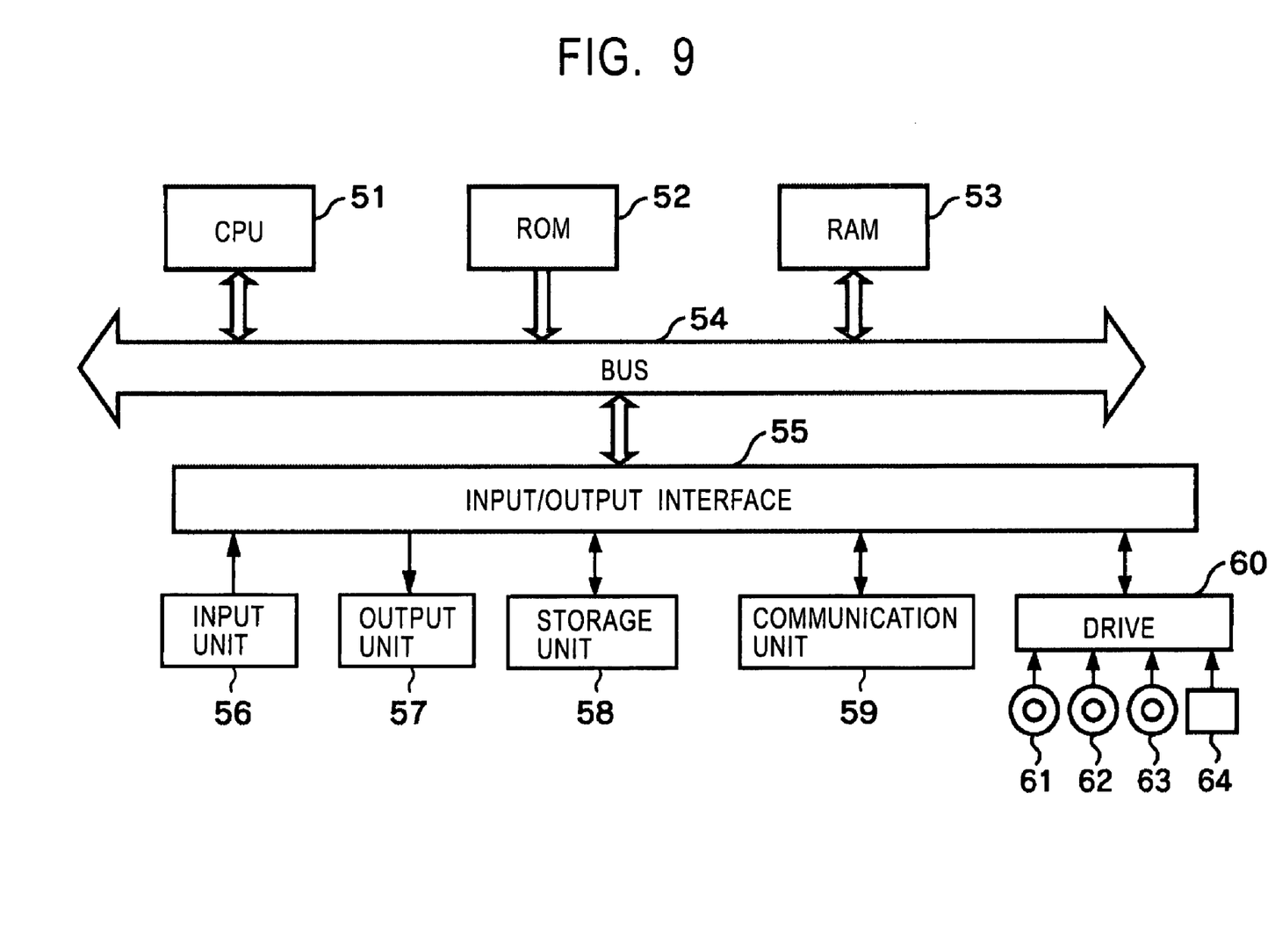
FIG. 9 is a block diagram showing an example of a multipurpose personal computer.

FIG. 9 shows an example of a multipurpose personal computer. The personal computer includes a central processing unit (CPU) 51. An input/output interface 55 is connected to the CPU 51 by a bus 54. The bus 54 connects to a read-only memory (ROM) 52 and a random access memory (RAM) 53.

The input/output interface 55 connects to an input unit 56 composed of input devices, such as a keyboard and a mouse, with which a user input operation commands, an output unit 57 for outputting a processing operation screen and a processed result screen to a display device, a storage unit 58 composed of a hard disk drive for storing programs and various types of data, etc., and a communication unit 59 for executing communication processing using a network formed by a local area network adapter. The input/output interface 55 also connects to a drive 60 for reading/writing data on a recording medium such as a magnetic disk 61 (including a flexible disk, an optical disk 62 (including a compact-disk read-only memory and a digital versatile disk), a magneto-optical disk 63 (including a MiniDisk), or a semiconductor memory 64.

The CPU 51 executes the motion vector detecting process in accordance with a program stored in the ROM 52, or a program loaded from the storage unit 58 into the RAM 53 after being read from one of the magnetic disk 61 to the semiconductor memory 64.

In this specification, the steps constituting the program recorded on the recording medium include not only time-series processes performed in described order, but also processes executed in parallel or separately.

What is claimed is:

1. An image processing apparatus for detecting motion vectors in an image composed of moving picture data and constituted by at least one first pixel block that is constituted by more than one sub pixel blocks, comprising:
    reduced-image generating means for generating a reduced image constituted by at least one second pixel block,
    wherein the second pixel block is generated by reducing the first pixel block with a predetermined factor;
    first detecting means for detecting first motion vectors of the second pixel blocks in the reduced image as common motion vectors;
    setting means for setting, by extending the common motion vectors by the predetermined factor, a plurality of possible motion vectors of said first pixel blocks;
    extracting means for extracting, for a sub pixel block, second motion vectors already detected by a second detecting means for adjacent sub pixel blocks and possible motion vectors for adjacent sub pixel blocks in the same picture;
    selecting means for selecting a base vector from the second motion vectors or possible motion vectors extracted by said extracting means; and
    second detecting means for detecting, in a predetermined search range around the base vector selected by said selecting means, second motion vectors for the sub pixel blocks of interest in the image,
    wherein the size of the predetermined search range when the selected base vector is a second motion vector is different from the predetermined search range when the selected base vector is a possible motion vector.

2. An image processing apparatus according to claim 1, further comprising coding means for performing variable length coding on the second motion vectors.

3. An image processing apparatus according to claim 2, wherein said extracting means extracts motion vectors used in the variable length coding by said coding means among the second motion vectors, or possible motion vectors used in the variable length coding by said coding means among the possible motion vectors already detected for the adjacent sub pixel blocks.

4. An image processing apparatus according to claim 1, wherein, when one of the second motion vectors is selected as the base vector, said second detecting means detects the motion vectors for the sub pixel block in the image in a search range narrower than a search range used when one of the possible motion vectors for the adjacent first pixel blocks is selected as the base vector by said selecting means.

5. An image processing apparatus according to claim 1, wherein at least one of said first detecting means, said selecting means, and said second detecting means uses block matching.

6. An image processing method for detecting motion vectors in an image composed of moving picture data and constituted by at least one first pixel blocks that is constituted by more than one sub pixel blocks, comprising:
    a reduced-image generating step for generating a reduced image constituted by at least one second pixel block,
    wherein the second pixel block is generated by reducing the first pixel block with a predetermined factor;
    a first detecting step for detecting motion vectors of the second block in the reduced image as common vectors;
    a setting step for setting, by extending the common vectors by the predetermined factor, a plurality of possible motion vectors of said first pixel blocks;
    an extracting step for extracting, for a sub pixel block, second motion vectors already detected by a second detecting means for adjacent sub pixel blocks and possible motion vectors for adjacent sub pixel blocks in the same picture;
    a selecting step for selecting a base vector from the second motion vectors or possible motion vectors extracted in said extracting step; and
    a second detecting step for detecting, in a predetermined search range around the base vector selected in said selecting step, second motion vectors for the sub pixel block of interest in the image,
    wherein the size of the predetermined search range when the selected base vector is a second motion vector is different from the predetermined search range when the selected base vector is a possible motion vector.

7. A computer-readable medium having a computer-executable program recorded thereon, when executed, the program causes the computer to detect motion vectors in an image composed of moving picture data and constituted by at least one first pixel blocks that is constituted by more than one sub pixel blocks, comprising:
    a reduced-image generating step for generating a reduced image constituted by second pixel blocks smaller,
    wherein the second pixel block is generated by reducing the first pixel block with a predetermined factor;
    a first detecting step for detecting motion vectors of the second pixel blocks in the reduced image as common motion vectors;
    a setting step for setting, by extending the common motion vectors by the predetermined factor, a plurality of possible motion vectors of said first pixel;
    an extracting step for extracting, for a sub pixel block of interest in the image, second motion vectors already detected by a second detecting means for adjacent sub pixel blocks and possible motion vectors for adjacent sub pixel blocks in the same picture;
    a selecting step for selecting a base vector from the second motion vectors or possible motion vectors extracted in said extracting step; and
    a second detecting step for detecting, in a predetermined search range around the base vector selected in said selecting step, second motion vectors for the sub pixel block of interest in the image,
    wherein the size of the predetermined search range when the selected base vector is a second motion vector is different from the predetermined search range when the selected base vector is a possible motion vector.

* * * * *